United States Patent
Van Houtum

(10) Patent No.: US 7,305,053 B2
(45) Date of Patent: Dec. 4, 2007

(54) DAT-AIDED FREQUENCY OFFSET DETECTION USING PHASE UNWRAPPING

(75) Inventor: Wilhelmus Johannes Van Houtum, Eindohoven (NL)

(73) Assignee: NXP B.V., Eindhoven (NL)

( * ) Notice: Subject to any disclaimer, the term of this patent is extended or adjusted under 35 U.S.C. 154(b) by 441 days.

(21) Appl. No.: 10/494,821

(22) PCT Filed: Oct. 31, 2002

(86) PCT No.: PCT/IB02/04580

§ 371 (c)(1),
(2), (4) Date: May 6, 2004

(87) PCT Pub. No.: WO03/041354

PCT Pub. Date: May 15, 2003

(65) Prior Publication Data

US 2005/0084042 A1    Apr. 21, 2005

(30) Foreign Application Priority Data

Nov. 6, 2001    (EP)    ................................ 01204247

(51) Int. Cl.
*H04L 1/00*    (2006.01)

(52) U.S. Cl. ...................................... 375/346; 375/344
(58) Field of Classification Search ................ 375/335, 375/346, 344, 347
See application file for complete search history.

(56) References Cited

U.S. PATENT DOCUMENTS

| | | | | |
|---|---|---|---|---|
| 4,847,872 | A | * | 7/1989 | Hespelt et al. ............... 375/344 |
| 5,416,800 | A | * | 5/1995 | Frank ........................... 375/239 |
| 6,035,003 | A | * | 3/2000 | Park et al. .................... 375/326 |
| 6,104,767 | A | * | 8/2000 | Atarius et al. ............... 375/344 |
| 6,590,942 | B1 | * | 7/2003 | Hessel et al. ................ 375/326 |

\* cited by examiner

*Primary Examiner*—Mohammed Ghayour
*Assistant Examiner*—Sonia J King

(57) ABSTRACT

A method of detecting frequency errors in a receiver during frame synchronization. A fast synchronization and reliable reception of the data requires a fast determination of frequency errors in the received signal. In CPFSK and OFDM, the frequency offset is even more important because of potential subcarrier interference. The method operates in the time domain and removes the 2p limitation in the phase representation by an unwrap function allowing a precise frequency determination.

10 Claims, 14 Drawing Sheets

DAT-AIDED FREQUENCY OFFSET DETECTION USING PHASE UNWRAPPING

The invention relates to correction of frequency errors in a radio communications system comprising at least one transmitter and one receiver.

The signal received by the receiver is a complex signal which is typically coded in some manner. The invention is particularly expedient in connection with OFDM signals, but is also useful in connection with other coding principles, e.g. CPFSK. The invention will be described below with reference to OFDM signals.

OFDM symbols are block-based signals which can be transmitted via a frame. The start of such a frame needs to be detected accurately, the method of detecting the proper time instant to start sampling of a new OFDM frame being called "frame synchronization". A commonly used way of acquiring frame synchronization comprises inserting some synchronization symbols within the OFDM symbols (pilot symbols) and at the start of a new frame (preamble symbols). The preamble symbols can be used by the receiver to generate the necessary timing for the OFDM frame synchronization and to correct frequency inaccuracy (carrier frequency offset). This carrier frequency offset can be introduced by i.e. non-perfect down-mixing of the RF part, Doppler effect and non-perfect demodulation. The carrier frequency offset may also be due to inaccuracy of the local oscillator in the transmitter and the receiver. The carrier frequency offset introduces InterCarrier Interference (ICI) in OFDM systems, because signal components from one subcarrier cause interference in neighboring subcarriers. The subcarrier orthogonality, of which the OFDM signals are assembled, is not maintained anymore through this ICI, and the system performance will degrade. The subchannel bandwidth or intercarrier spacing of an OFDM signal is much smaller than the signal bandwidth of the OFDM signal. A small frequency offset in the OFDM system leads to a substantial degradation of the Signal to Noise Ratio (SNR). Thus, there are many good reasons for correcting frequency errors as quickly and accurately as possible.

Various methods of correcting phase or frequency errors within OFDM signals are known, and reference may be made e.g. to European Patent Applications 1 028 564 and 795 985 as well as WO 98/00946.

The technique disclosed in WO 98/00946 exclusively operates in the frequency domain, that is after a fast Fourier transform (FFT) has been performed on the incoming signal. The above-mentioned European patent applications disclose a mixed technique allowing the error to be corrected in the time domain, but the information necessary to correct the error can only be obtained after FFT. This may cause problems as to how fast the correction can be performed. A frequent drawback is that accurate time synchronization is required for the FFT operation. A further drawback is that the prior art techniques exhibit a much too restrictive capture range.

It is an object of the invention to provide a method of detecting frequency errors which operates with a greater capture range than the prior art.

According to the invention, this is possible in the time domain. Well-known problems in the time domain are overcome according to the invention, thereby speeding up the frequency error detection while obviating time synchronization because no FFT operation is performed.

The object is achieved in that the phase of an incoming complex signal is calculated with an arctangent function, an unwrap function is produced from the output signal from the arctangent function, the modulo $2\pi$ limitation introduced with the arctangent function is removed by means of the unwrap function, thereby producing an absolute phase representation, and the frequency error is determined by comparing phase representation values which are shifted predetermined in time.

A feature of the invention is that it exclusively operates in the time domain, (on time differences between two time instants without awareness of time synchronization). It is well-known that the phase may be determined by arctangent calculation on the in-phase and quadrature components of the signals, but it is also well-known that the arctangent function has a range which is limited to $\pm\pi$ modulo $2\pi$, which introduces a non-linearity causing a phase and ambiguity of $\pm\pi$. The invention is based on the finding that modulo $2\pi$ limitation introduced with the arctangent function can be removed by means of an unwrap function, so that the frequency error can be determined by comparing phase representation values which are shifted predetermined in time.

The accuracy depends on how the complex signals are coded. The following detailed description will give an example where the OFDM signals comprise a particular preamble which is defined in IEEE P802.11a/D7.0, and will be referred to as "IEEE preamble" below. It has surprisingly been found that the absolute phase representation obtained by means of the unwrapped function on a signal with the above-mentioned IEEE preamble is a smooth curve. The smoother the curve, the greater the speed and accuracy of the frequency error detection of the invention.

In a preferred embodiment, the unwrapped function accumulates k times $2\pi$, where k depends on the wrapped function so that k will be increased by 1 if the difference between the last corrected sample and the current sample is smaller than $-\pi$, and k will be decreased by 1 if the difference between the last corrected sample and the current sample is greater than $\pi$.

It is important to understand that the principles of the invention may be applied in general, but that an incoming signal comprising specific dedicated preamble signals and data signals is frequently involved.

The invention also relates to an apparatus for performing the method of detecting frequency errors in a receiver.

The apparatus comprises a complex phase calculator for calculating the phase of an incoming complex signal on a sample-by-sample basis of the in-phase and quadrature components of the signal and performing an arctangent function on the in-phase and quadrature components of the incoming signal, a phase unwrap module for removing discontinuities in the phase if the phase passes the in-phase axes in the complex plane with an absolute value greater than $\pi$, and a comparator module arranged to compare the difference in phase signal values at predetermined time intervals, the difference in said values representing frequency errors in the input signal to the complex phase calculator.

It has been found that the best result is achieved when the phase unwrap module is inserted between the complex phase calculator and the comparator module, but it can also be shown that it is possible to insert the comparator module between the complex phase calculator and the phase unwrap module. In any case, it is an advantage that the signal processing is terminated in a mean estimator circuit.

The invention also relates to a method of designing a complex preamble signal. It has previously been explained that, on the other hand, the IEEE preamble involves a smooth phase representation but, on the other hand, the invention teaches that the preamble can be optimized. According to the invention, the optimal preamble may be found by performing the steps of deciding upon a first preamble signal, performing an arctangent function on a number of sample values of the in-phase and quadrature components of the signal decided upon, deciding upon a second and further different preamble signal, and performing the respective arctangent function, and choosing such a preamble signal whose smooth curve signal is the smoothest.

A preferred embodiment comprises choosing precisely the preamble signal which involves the smallest error in connection with the arctangent function being approximated with a sine wave.

Finally, the invention relates to a computer-readable medium comprising a program for making a computer detect the frequency error of a complex communication signal. According to the invention, a program comprises the steps as defined in claim 14.

These and other aspects of the invention are apparent from and will be elucidated with reference to the embodiment(s) described hereinafter.

Figure 1:
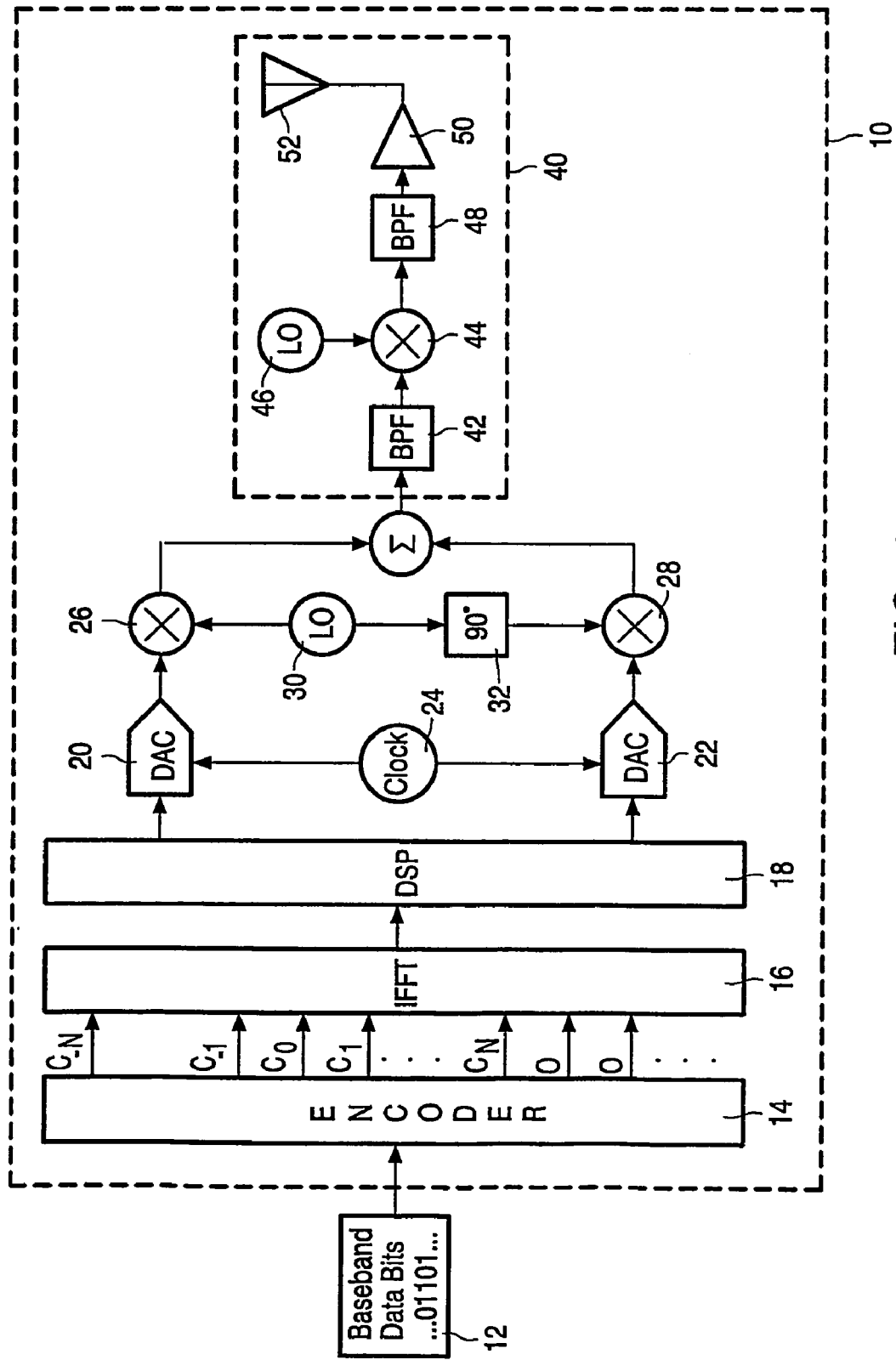
FIG. 1 shows a block diagram of a typical OFDM transmitter according to the prior art.

FIG. 1 illustrates a block diagram of a typical OFDM transmitter according to the prior art. Orthogonal frequency division multiplexing (OFDM) is a robust technique for efficiently transmitting data through a channel. The technique uses a plurality of sub-carrier frequencies (sub-carriers) within a channel bandwidth to transmit the data. These sub-carriers are arranged for optimal bandwidth efficiency compared to more conventional transmission approaches, such as frequency division multiplexing (FDM), which wastes large portions of the channel bandwidth in order to separate and isolate the sub-carrier frequency spectra and thereby avoid inter-carrier interference (ICI). By contrast, although the frequency spectra of OFDM sub-carriers overlap significantly within the OFDM channel bandwidth, OFDM nonetheless allows resolution and recovery of the information that has been modulated onto each sub-carrier. Additionally, OFDM is much less susceptible to data loss due to multipath fading than other conventional approaches for data transmission, because inter-symbol interference is prevented through the use of OFDM symbols that are long in comparison to the length of the channel impulse response. Also, the coding of data onto the OFDM sub-carriers can take advantage of frequency diversity to mitigate loss due to frequency-selective fading. The general principles of OFDM signal transmission can be described with reference to FIG. 1 which is a block diagram of a typical OFDM transmitter according to the prior art. An OFDM transmitter 10 receives a stream of baseband data bits 12 as its input. These input data bits 12 are immediately fed into an encoder 14, which takes these data bits 12 in segments of B bits every $T_g+T_s$ seconds, where $T_s$ is an OFDM symbol interval and $T_g$ is a cyclic prefix or guard interval. Encoder 14 typically uses a block and/or convolutional coding scheme to introduce error-correcting and/or error-detecting redundancy into the segment of B bits and then sub-divides the coded bits into 2N sub-segments of m bits. The integer m typically ranges from 2 to 6. In a typical OFDM transmission system, there are 2N+1 OFDM sub-carriers, including the zero frequency DC sub-carrier which is not generally used to transmit data since it has no frequency and therefore no phase. Accordingly, encoder 14 then typically performs $2^m$-ary quadrature amplitude modulation (QAM) encoding of the 2N sub-segments of m bits in order to map the sub-segments of m bits to predetermined corresponding complex-valued points in a $2^m$-ary constellation. Each complex-valued point in the constellation represents discrete values of phase and amplitude. In this way, encoder 14 assigns to each of the 2N sub-segments of m bits a corresponding complex-valued $2^m$-ary QAM sub-symbol $c_k=a_k+jb_k$, where $-N \leq k \leq N$, in order to create a sequence of frequency-domain sub-symbols that encodes the B data bits. Also, the zero-frequency sub-carrier is typically assigned $c_0=0$. Encoder 14 then passes the sequence of sub-symbols, along with any additional zeroes that may be required for interpolation to simplify filtering, onto an inverse discrete Fourier transformer (IDFT) or, preferably, an inverse fast Fourier transformer (IFFT) 16. Upon receiving the sequence of OFDM frequency-domain sub-symbols from encoder 14, IFFT 16 performs an inverse fast Fourier transform on the sequence of sub-symbols. In other words, it uses each of the complex-valued sub-symbols, $c_k$, to modulate the phase and amplitude of a corresponding one of 2N+1 sub-carrier frequencies over a symbol interval $T_s$. The sub-carriers are given by $\exp(-2\pi j f_k t)$, and therefore, have baseband frequencies of $f_k=(k/T_s)$, where k is the frequency number and is an integer in the range $-N \leq k \leq N$. IFFT 16 thereby produces a digital time-domain OFDM symbol of duration $T_s$ given by:

$$u(t) = \sum_{k=-N}^{N} c_k \exp(-2\pi j f_k t) \quad 0 \leq t \leq T_s$$

As a result of this discrete-valued modulation of the OFDM sub-carriers by frequency-domain sub-symbols over symbol intervals of $T_s$ seconds, the OFDM sub-carriers each display a sinc x=(sin x)/x spectrum in the frequency domain. By spacing each of the 2N+1 sub-carriers $1/T_s$ apart in the frequency domain, the primary peak of the sub-carrier of each sinc x spectrum coincides with a null of the spectrum of every other sub-carrier. In this way, although the spectra of the sub-carriers overlap, they remain orthogonal to one another. Note that the modulated sub-carriers fill the channel bandwidth very efficiently. As indicated on FIG. 1, the digital time-domain OFDM symbols produced by IFFT 16 are then passed to a digital signal processor (DSP) 18. DSP 18 performs additional spectral shaping on the digital time-domain OFDM symbols and also adds a cyclic prefix or guard interval of length $T_g$ to each symbol. The cyclic prefix is generally just a repetition of part of the symbol. This cyclic prefix is typically longer than the OFDM channel impulse response and, therefore, acts to prevent inter-symbol interference (ISI) between consecutive symbols. The real and imaginary-valued digital components that make up the cyclically extended, spectrally-shaped digital time-domain OFDM symbols are then passed to digital-to-analog converters (DACs) 20 and 22, respectively. DACs 20 and 22 convert the real and imaginary-valued digital components of the time-domain OFDM symbols into in-phase and quadrature OFDM analog signals, respectively, at a conversion or sampling rate $f_{ck\_t}$ as determined by a clock circuit 24. The in-phase and quadrature OFDM signals are then passed to mixers 26 and 28, respectively. In mixers 26 and 28, the in-phase and quadrature OFDM signals from DACs 20 and 22 are used to modulate an in-phase intermediate frequency (IF) signal and a 90° phase-shifted (quadrature) IF signal, respectively, in order to produce an in-phase IF OFDM signal and a quadrature IF OFDM signal, respectively. The in-phase IF signal that is fed to mixer 26 is produced directly by a local oscillator 30, while the 90° phase-shifted IF signal that is fed to mixer 28 is produced by passing the in-phase IF signal produced by local oscillator 30 through a 90° phase-shifter 32 before feeding it to mixer 28. These two in-phase and quadrature IF OFDM signals are then combined in combiner 34 to form a composite IF OFDM signal. In some prior art transmitters, the IF mixing is performed in the digital domain using a digital synthesizer and digital mixers before the digital-to-analog conversion is performed. This composite IF OFDM signal is then passed into radio frequency (RF) transmitter 40. Many variations of RF transmitter 40 exist and are well known in the art, but typically, RF transmitter 40 includes an IF bandpass filter 42, an RF mixer 44, an RF carrier frequency local oscillator 46, an RF bandpass filter 48, an RF power amplifier 50, and an antenna 52. RF transmitter 40 takes the IF OFDM signal from combiner 34 and uses it to modulate a transmission carrier of frequency $f_{ct}$, generated by RF local oscillator 46, in order to produce an RP OFDM-modulated carrier that occupies a channel bandwidth, BW. Because the entire OFDM signal must fit within this channel bandwidth, the channel bandwidth must be at least (1/Ts)·(2N+1) Hz wide to accommodate all the modulated OFDM sub-carriers.

Figure 2:
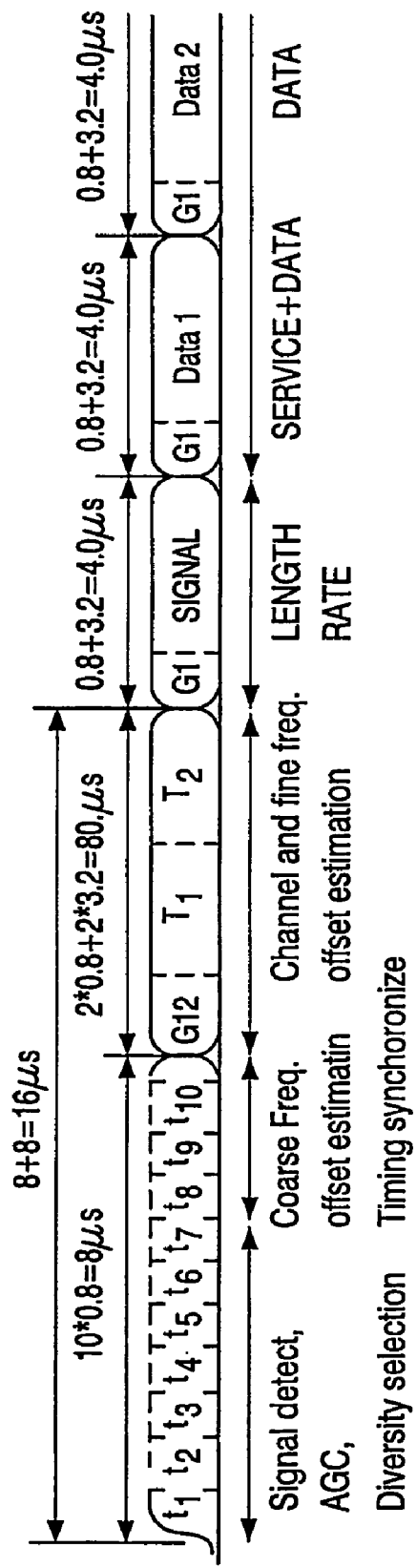
FIG. 2 shows an OFDM training structure.

FIG. 2 illustrates an OFDM training structure, i.e. a Physical Layer Convergence Procedure (PLCP) preamble, where $t_1$ to $t_{10}$ denote short training symbols, and $T_1$ and $T_2$ denote long training symbols. The PLCP preamble is followed by a signal field and data. The total training length is 16 μs. The dashed boundaries in FIG. 2 denote repetitions due to the periodicity of the inverse Fourier transform. A short OFDM training symbol consists of 12 sub-carriers, which are modulated by complex number elements.

Figure 3:
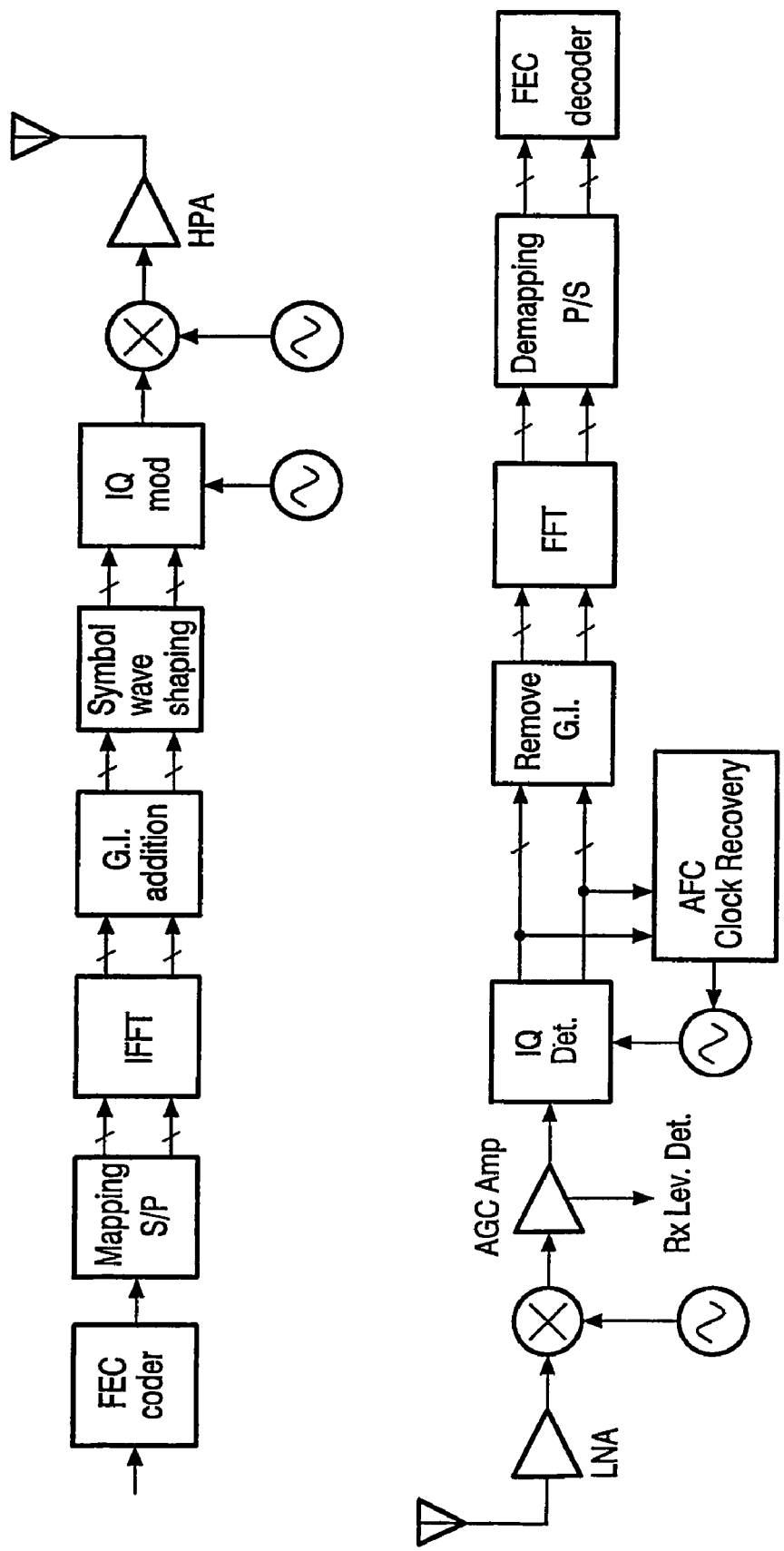
FIG. 3 shows an example of a transmitter and receiver block diagram for an OFDM physical layer (PHY).

FIG. 3 illustrates an example of a transmitter and receiver block diagram for an OFDM physical layer (PHY). The OFDM transmitter and receiver is further detailed in the IEEE P802.11a/D5.0 standard. Major specifications for OFDM PHY are listed in the table below.

| | |
|---|---|
| Information data rate | 6, 9, 12, 18, 24, 36, 48 and 54 Mbit/s (6, 12 and 24 Mbit/s are mandatory) |
| Modulation | BPSK-OFDM |
| | QPSK-OFDM |
| | 16-QAM-OFDM |
| | 64-QAM-OFDM |
| Error Correcting Code | K-7 (64 states) Convolutional code |
| Coding rate | ½, ⅔, ¾ |
| Number of sub-carriers | 52 |
| OFDM symbol duration | 4.0 μs |
| Guard interval | 0.8 μs ($T_{G1}$) |
| Occupied bandwidth | 16.6 MHz |

Attention is drawn to the receiver, and in particular the Automatic Frequency Correction (AFC) Clock Recovery. As indicated in FIG. 3, any frequency error or misalignment between the carrier frequency of the incoming signal and an oscillator, is adjusted by an AFC Clock Recovery circuit. The invention proposed is located in the circuit elements AFC Clock Recovery, the oscillator controlled by the AFC Clock Recovery, and the clock recovery part of the I Q Detect.

The carrier frequency offset estimation, as stated before, is performed in the time domain by defining the phase on a sample-by-sample basis of the in-phase and quadrature components. This definition of the phase for every incoming signal can be seen as a representation of the incoming signal in the Phase Domain, where the phase domain is defined as follows:

The phase domain represents on a sample basis the phase between every in-phase (I(t)) and quadrature (Q(t)) component of the incoming complex signal (x(t)) as a function of time.

In the phase domain, the subcarrier ambiguity problem will be introduced by the calculation of the phase with the arctangent function on the incoming complex (in-phase, quadrature) samples. The arctangent function has a range which is limited to ±π modulo 2π. The modulo 2π of the arctangent function introduces a non-linearity which causes a phase ambiguity of ±π which is due to the subcarrier ambiguity of ±½, as will be shown in the sequel.

Let the carrier frequency offset be expressed as $$\Delta f = \alpha \frac{1}{NT_s}, \alpha \in R \quad (1)$$

with $T_s$ the time between two samples, N the number of subcarriers of the OFDM signal and $NT_s$ the period time of an OFDM symbol, so Eq. (1) shows the carrier frequency offset expressed in α times the intercarrier spacing (1/$NT_s$).

If we use the well-known Fourier transform pair $$X(f-\Delta f) \leftrightarrow e^{(j2\pi \Delta f t)} x(t), \quad (2)$$

with x(t) the incoming OFDM signal, then Eq. (2) shows that a constant frequency shift causes a linear increasing phase of the OFDM signal x(t). This linear behavior of the phase can be exploited to estimate, in the time domain, the carrier frequency offset of x(t). If we want to use the phase of x(t) we need the arctangent function $$\psi(t) = 2\pi\mathrm{f}t + \arg\{x(t)\} = \Delta\phi(t) + \Theta(t) = \arctan\left\{\frac{Q(t)}{I(t)}\right\} \mod\left(2\pi\right) \quad (3)$$

If we combine Eq. (1) and Eq. (3) we obtain $$\varphi(t) = 2\pi\frac{\alpha}{NT_s}t + \Theta(t) \mod(2\pi) \quad (4)$$

Substitution of the OFDM symbol period in Eq. (4) yields $$\psi(NT_s) = \alpha 2\pi + \Theta(NT_s)\mod(2\pi) \quad (5)$$

The modulo ($2\pi$) part of Eq. (5) limits the value of $\psi(NT_s)$ at $\pm\pi$ so, the maximum value of $\alpha$ is then $$\alpha_{max} = \frac{\psi(NT_s)_{max} - \Theta(NT_s)}{2\pi} = \pm\left(\frac{1}{2} - \frac{\Theta(NT_s)}{2\pi}\right) \quad (6)$$

Eq. (6) shows that the subcarrier ambiguity is introduced by the modulo $2\pi$ of the arctangent function. This modulo $2\pi$ of the arctangent function is a non-linear operation on $\psi(t)$, so if we want to use the phase $\psi(t)$ we need the arctangent function without the modulo $2\pi$ non-linearity. This document describes a non-linear FED which is able to remove this non-linearity, this removal is also a non-linear operation on the phase. By removing the modulo $2\pi$ limitation, $\psi(t)$ becomes a continuous function without any phase jumps. If we look in the complex plane (in-phase component on x-axes and quadrature component on y-axes) a phase jump will occur if the phase moves from the first quadrant to the third or fourth quadrant (or vice versa) with an absolute value larger than $\pi$. Thus discontinuities in the phase occur if the phase passes the in-phase axes in the complex plane with an absolute value larger than $\pi$.

In the further part of this document, the removal of these phase jumps is called: "phase unwrapping". This phase unwrapping results in an absolute phase function $\Phi(t)$, which means that the value of the phase may be, for example, $\Phi(t)=23.67\pi$ and is not limited to the relative value of $\psi(t)=-0.33\pi \mod(2\pi)$. It is this absolute value representation $\Phi(t)$ that gives us the wide capture range of the non-linear FED proposed in this document. It will be shown that the capture range of the FED is not limited anymore by $\pm\frac{1}{2}$ times the intercarrier spacing (assuming $\Theta(NT_s)/2\pi$ equals zero) introduced by the arctangent function.

In the following the phase representation of a discrete OFDM signal with frequency offset will be described. The discrete OFDM signal $$x_n^\alpha = \sum_{i=-\frac{N}{2}+p}^{\frac{N}{2}-p} B_i e^{j2\pi\left(\frac{i}{NT_s}\frac{\alpha}{NT_s}\right)nT_s} = e^{j\alpha\frac{2\pi}{N}n}\sum_{i=-\frac{N}{2}+p}^{\frac{N}{2}-p} B_i e^{j(i\frac{2\pi}{N}n)}, \quad (7)$$

in which p is the number of unused subcarriers of the OFDM symbol, $B_i$ is a complex signal which represents the initial phase and amplitude of the I-th subcarrier and n is the sample index. The phase of $x_n^\alpha$ $$\Theta_n^\alpha = \arg\{x_n^\alpha\} = \alpha\frac{2\pi}{N}n + \arg\left\{\sum_{i=-\frac{N}{2}+p}^{\frac{N}{2}-p} B_i e^{j(i\frac{2\pi}{N}n)}\right\}, \quad (8)$$

is a summation of a linear function of $\alpha$ and the summation of the phases of the subcarriers. This linear function of a can also be obtained for a specific discrete OFDM preamble signal, as will be shown in the following where the phase representation of the IEEE P802.11a/D7.0 preamble (further referred to as: "IEEE preamble") is used in W-LAN OFDM systems. This IEEE W-LAN OFDM system uses the following figures; N=64 points (I)FFT, with a sample frequency of $F_s$=20 MHz ($T_s$=50 ns) and p=6 unused subcarriers, substituting these figures in Eq. (7) and Eq. (8) we obtain $$x_n^\alpha = e^{j\alpha\frac{\pi}{32}n}\sum_{i=-26}^{26} B_i e^{j(i\frac{\pi}{32}n)}, \quad (9)$$

for the OFDM signal and $$\Theta_n^\alpha = \alpha\frac{\pi}{32}n + \arg\left\{\sum_{i=-26}^{26} B_i e^{j(i\frac{\pi}{32}n)}\right\}, \quad (10)$$

for the phase of the OFDM signal.

The preamble is defined in IEEE P802.11a/D7.0. It is a short OFDM symbol consisting of 12 subcarriers which are modulated by the elements $S_i$ of the sequence given by:

$$S=S_{-i},\ldots,S_i$$
$$\sqrt{13/6}(0,0,1+j,0,0,0,-1-j,0,0,0,1+j,0,0,0,-1-j,$$
$$0,0,0,-1-j,0,0,0,1+j,0,0,0,0,0,0,-1-j,0,0,0,-1-$$
$$j,0,0,0,1+j,0,0,0,1+j,0,0,0j1+j,0,0,0,1+j,0,0),i=0,$$
$$1,\ldots,25,26 \quad (11)$$

with the indexes (−26, . . . ,26) referring to the subcarrier numbers of the OFDM symbol. The multiplication by the factor $\sqrt{13/6}$ is needed to normalize the average power because the IEEE preamble only uses 12 out of the 52 subcarriers. It can be seen from Eq. (11) that only the subcarriers with an index which is a multiple of four are non-zero, so substitution of m=i/4 in Eq. (9) and exchanging the elements $B_i$ with the elements $S_i$ yields, $$p_n^\alpha = \sqrt{13/6}\, e^{j\alpha\frac{\pi}{32}n}\sum_{m=-6}^{6} S_m e^{jm\frac{\pi}{8}n} \quad m \neq 0, \quad (12)$$

the representation of the IEEE preamble and $$\tilde{\phi}_n^\alpha = \alpha\frac{\pi}{32}n + \arg\left\{\sum_{m=-6}^{6} S_m e^{jm\frac{\pi}{8}n}\right\} \quad m \neq 0, \quad (13)$$

the phase of this IEEE preamble. The subcarrier So is equal to zero (DC-subcarrier), so the index m=0 is not used for the IEEE preamble. Eq. (12) shows that if m=±1 the fundamental frequency $F_0=1/NT_S$ in the OFDM signal $$F_p = 4F_0 = 4\frac{1}{64T_s} = \frac{1}{16T_s}. \quad (14)$$

Then the period time or periodicity of the preamble $$T_p = \frac{1}{F_p} = \frac{1}{4}T_0 = 16T_s. \quad (15)$$

is 16 samples (not 64 as the OFDM signal), so the IEEE preamble has a duration of 16 samples (800 ns).

If we look somewhat closer at the components of the sequence S we see that $$S_m = -S_{-m} \Rightarrow S_m e^{-j\beta m} + S_{-m} e^{j\beta m} = j2S_m \sin(\beta_m) \, m=1,3,5,$$

$$S_m = S_{-m} \Rightarrow S_m e^{j\beta m} + S_{-m} e^{-j\beta m} = 2S_m \cos(\beta_m) \, m=2,4,6, \quad (16)$$

with $\beta_m$ an arbitrary number. Using this goniometric equality in Eq. (12) yields $$p_n^{\pi} = \quad (17)$$
$$2\sqrt{13/6} \, e^{j\alpha\frac{\pi}{32}n} \{S_2\cos(2\frac{\pi}{8}n) + S_4\cos(4\frac{\pi}{8}n) + S_6\cos(6\frac{\pi}{8}n) +$$
$$j[S_1\sin(\frac{\pi}{8}n) + S_3\sin(3\frac{\pi}{8}n) + S_5\sin(5\frac{\pi}{8}n)]\},$$

and with (18)
$$S_1 = S_2 = -(1+j) = -\sqrt{2}\, e^{j\frac{\pi}{4}}$$
$$S_3 = S_4 = S_5 = S_6 = (1+j) = \sqrt{2}\, e^{j\frac{\pi}{4}}.$$

the representation of the IEEE preamble becomes $$p_n^{\pi} = \quad (19)$$
$$2\sqrt{13/6} \, e^{j(\alpha\frac{\pi}{32}n + \frac{\pi}{4})} \{-\cos(2\frac{\pi}{8}n) + \cos(4\frac{\pi}{8}n) + \cos(6\frac{\pi}{8}n) +$$
$$j[-\sin(\frac{\pi}{8}n) + \sin(3\frac{\pi}{8}n) + \sin(5\frac{\pi}{8}n)]\}.$$

Figure 4:
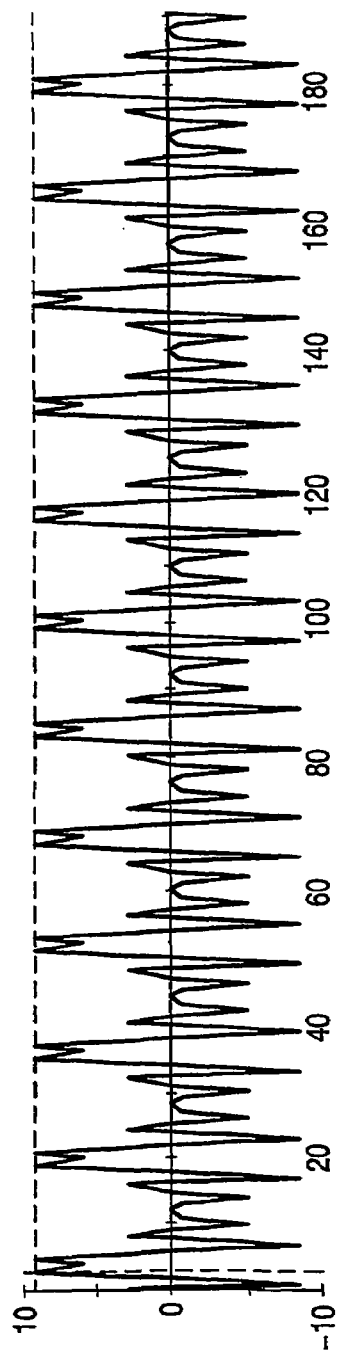
FIG. 4 shows in-phase (upper part) and quadrature (lower part) components of 12 IEEE preamble symbols.
Figure 4:
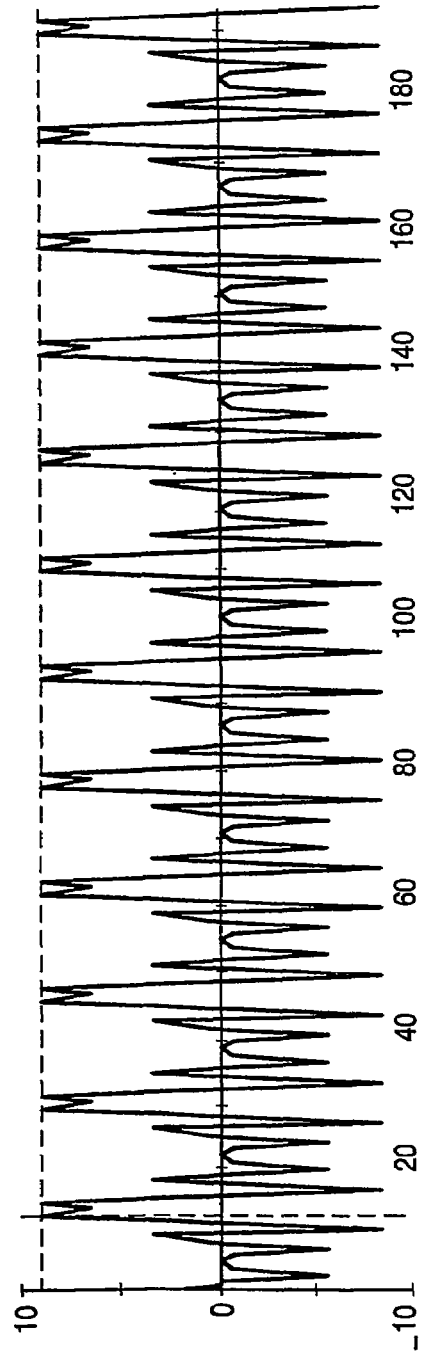

FIG. 4 shows in the upper part the in-phase component and in the lower part the quadrature component of the IEEE preamble without carrier frequency offset (α=0) for 12 IEEE preamble symbols (192 samples on the horizontal axes).

The phase of the IEEE preamble $$\tilde{\phi}_n^{\alpha} = \frac{\pi}{4} + \alpha\frac{\pi}{32}n + \theta_n, \quad (20)$$

$$\theta_n = \arctan\left\{\frac{-\sin(\frac{\pi}{8}n) + \sin(3\frac{\pi}{8}n) + \sin(5\frac{\pi}{8}n)}{-\cos(2\frac{\pi}{8}n) + \cos(4\frac{\pi}{8}n) + \cos(6\frac{\pi}{8}n)}\right\}$$

is a summation of an initial phase (π/4), a linear changing phase as a function of the carrier frequency offset $$\alpha\frac{\pi}{32}n$$

and an arctangent function performed on a summation of sinusoids with multiple frequencies ($\theta_n$). The behavior of $\theta_n$ is not easy to determine analytically, so it is obtained via simulations and is shown in FIG. 5.

Figure 5A:
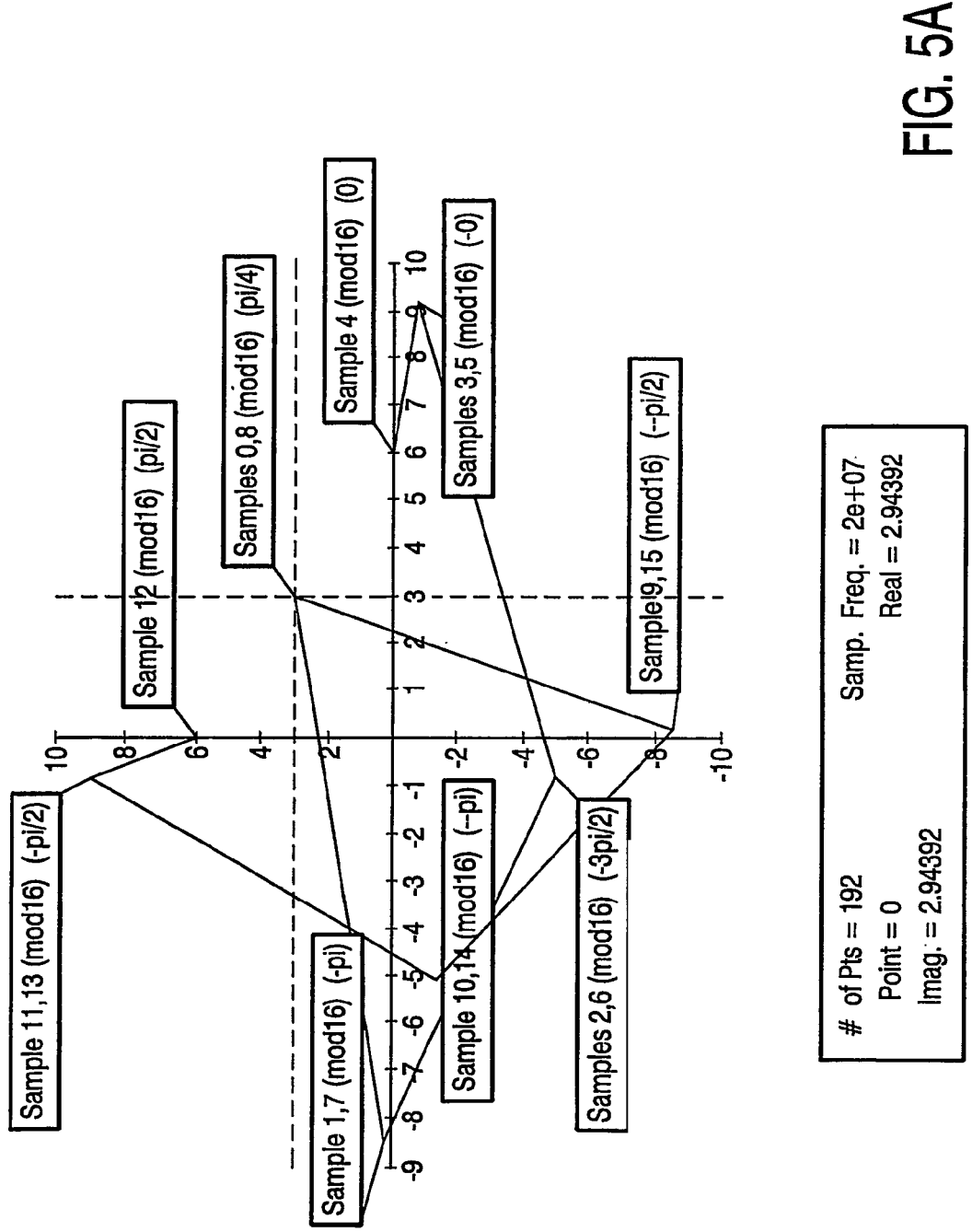
FIG. 5 shows a representation of an IEEE preamble phase in a complex plane (upper part) and in a phase domain (lower part).
Figure 5B:
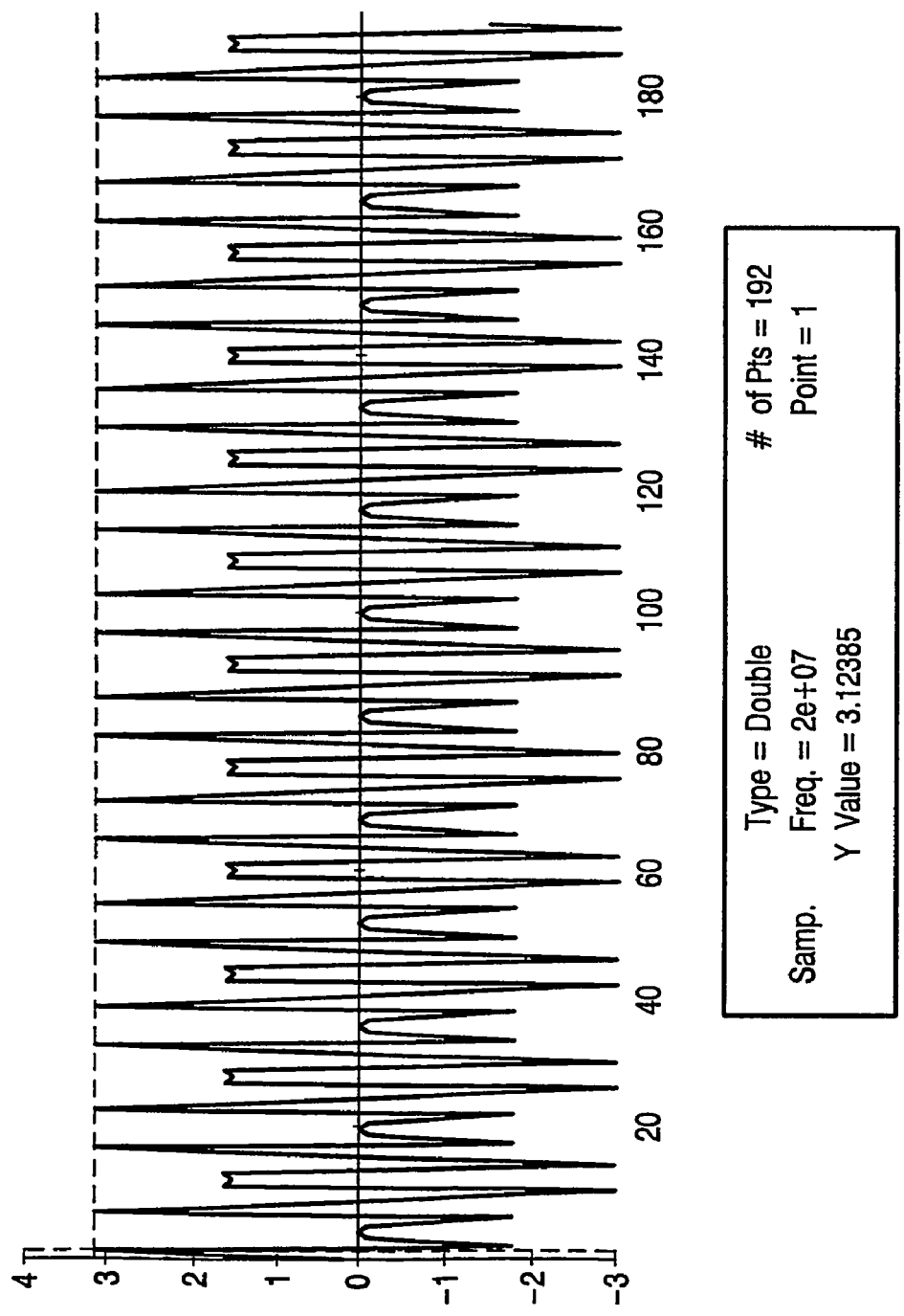

FIG. 5 represents the in-phase and quadrature components for every sample of the IEEE preamble (periodic with 16) in the upper part (complex plane representation) and the arctangent values of the IEEE preamble in the lower part (phase domain representation).

It can be seen from FIG. 5 that a modulo 2π phase correction needs to be performed between samples 1,2 (mod16),6,7(mod16),10,11(mod16) and 13,14(mod16), because between these consecutive samples the phase of the IEEE preamble passes the in-phase axes with an absolute value larger than π.

The 2π phase correction is performed by an unwrap function ($U_n$) and can be described as follows:

The unwrap function ($U_n$) accumulates k time 2π, where k depends on the wrapped function to which $U_n$ is applied.

k will be increased by one if the difference between the last corrected sample and the current sample is smaller than −π.

k will be decreased by one if the difference between the last corrected sample and the current sample is larger than π.

Figure 6:
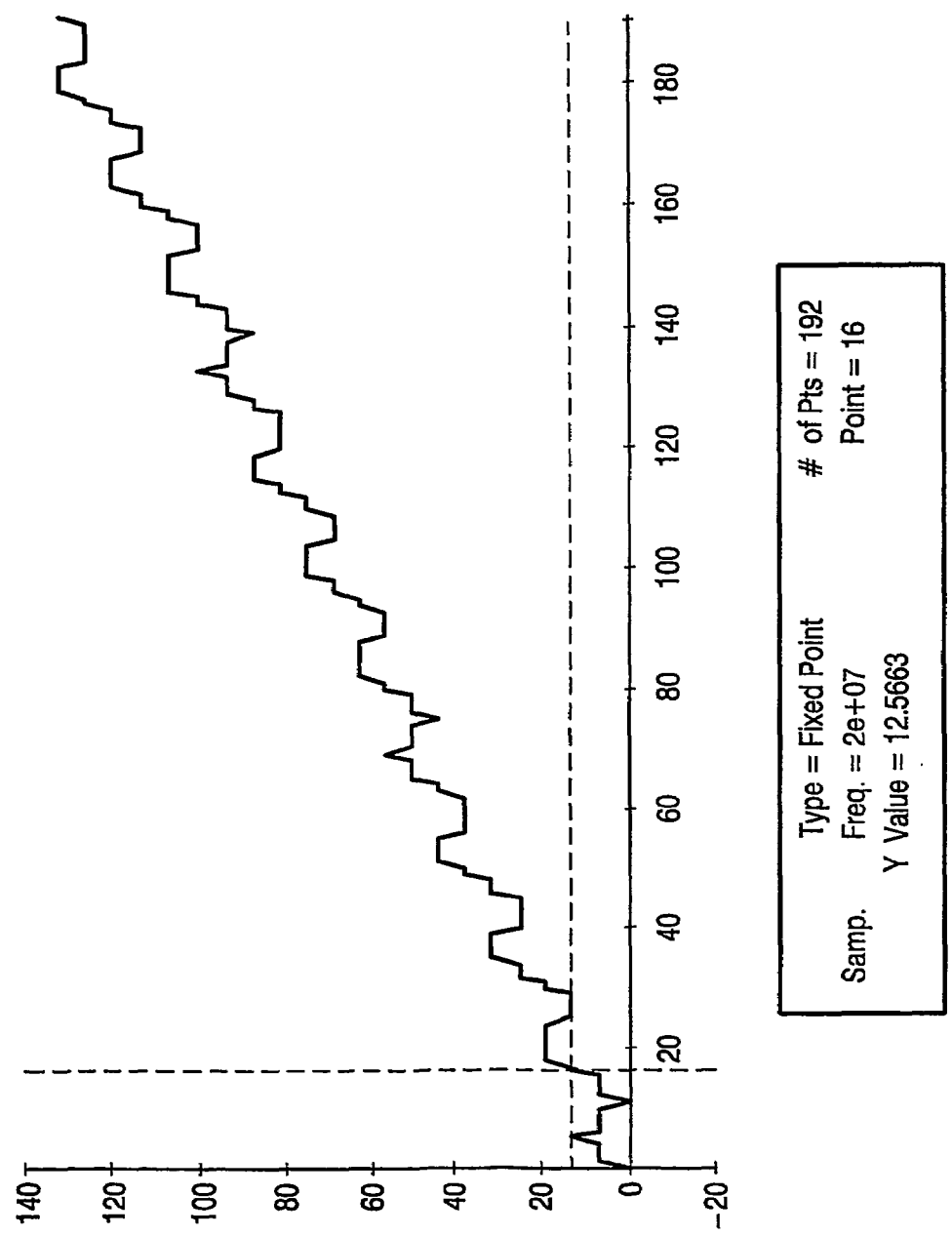
FIG. 6 shows a possible curve of an unwrap function $U_n$.

FIG. 6 shows a possible curve of $U_n$, every function value $U_n$ is a multiple of 2π(k times 2π) and depends on the wrapped function.

Applying the unwrap function Un to the wrapped phase $\tilde{\phi}_n^{\alpha}$ of the IEEE preamble, shown in FIG. 5, yields $$\phi_n^{\alpha} = \frac{\pi}{4} + \alpha\frac{\pi}{32}n + \theta_n, \quad (21)$$

the unwrapped phase of the IEEE preamble. The wrapped phase $\tilde{\phi}_n^{0}$ and the unwrapped phase $\phi_n^{0}$ are represented by the solid line and dotted line respectively, in FIG. 7.

Figure 7:
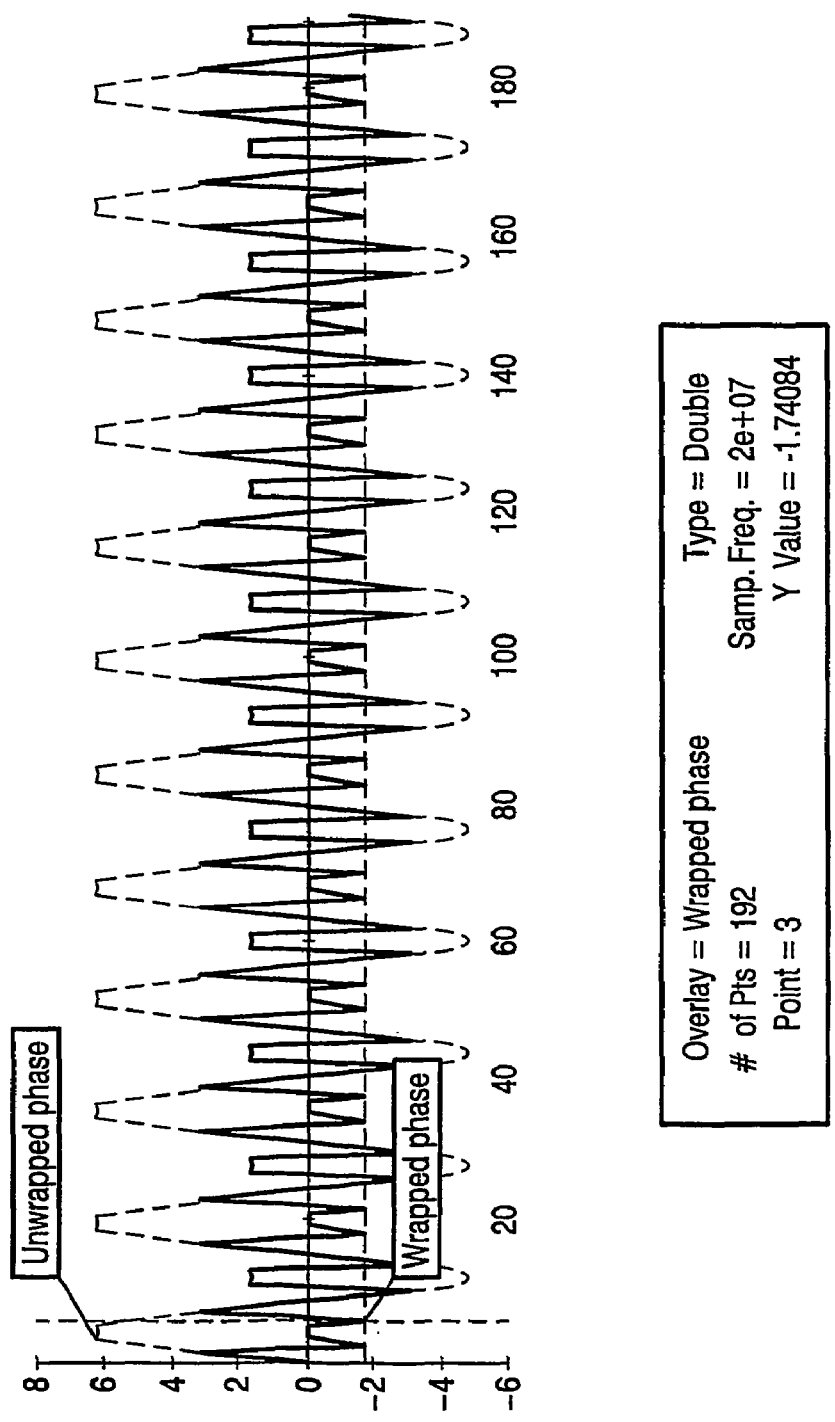
FIG. 7 shows a wrapped and an unwrapped IEEE preamble phase with $\alpha=0$.

It can be seen from FIG. 7 that the unwrapped phase $\phi_n^{0}$ behaves like a sinewave. Eq. (21) shows that the sinewave behavior of $\phi_n^{\alpha}$ with α=0, is the behavior if $\theta_n$. If we take a closer look at this sinewave behavior we are able to determine an approximation of $$\phi_n \approx \frac{7\pi}{4}\sin\left(\frac{\pi}{8}n\right), \quad (22)$$

and Eq. (21) can be approximated with $$\phi_n^{\alpha} \approx \frac{\pi}{4} + \alpha\frac{\pi}{32}n + \frac{7\pi}{4}\sin\left(\frac{\pi}{8}n\right). \quad (23)$$

If we look at Eq. 20, we see that the carrier frequency offset gives a linear increase of the phase. If we are able to determine the angle of direction of the wrapped phase $\tilde{\phi}_n^{\alpha}$, then we know the frequency offset represented by α. By applying the unwrap function $U_n$ to $\tilde{\phi}_n^\alpha$, we obtain the unwrapped phase $\phi_n^\alpha$ shown by Eq. (21). If we look at FIG. 8, we can see that the unwrapped phase $\phi_n^1$ increases linearly due to the carrier frequency offset $\Delta f = 312.5$ kHz of one intercarrier spacing ($\alpha = 1$).

Figure 8:
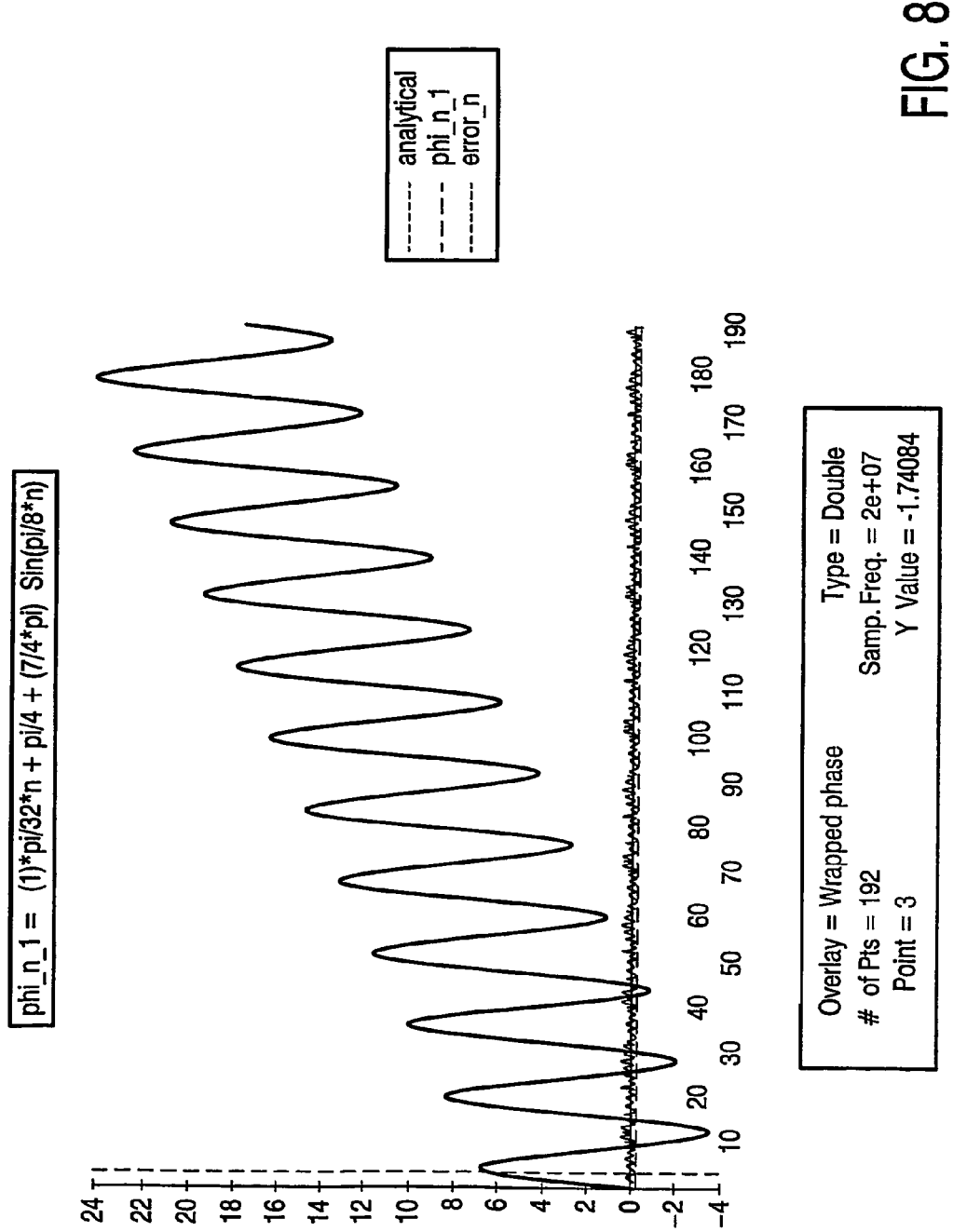
FIG. 8 shows an IEEE preamble phase with a carrier offset of one inter-carrier spacing $\alpha=1$.

As mentioned earlier, the behavior of $\theta_n$ is approximated with a sinewave, and it can be seen from FIG. 8 that this approximation can also be used in the case $\alpha \neq 0$.

The unwrapping and the subsequent detection of the angle of direction of the wrapped phase $\tilde{\phi}_n^\alpha$ are performed by the non-linear FED and will be described in detail in the following.

The carrier frequency offset estimation, as stated before, is performed in the time domain by defining the phase on a sample-by-sample basis of the in-phase and quadrature components without the modulo $2\pi$ limitation. The removal of this limitation is performed by the phase unwrap function.

Figure 9:
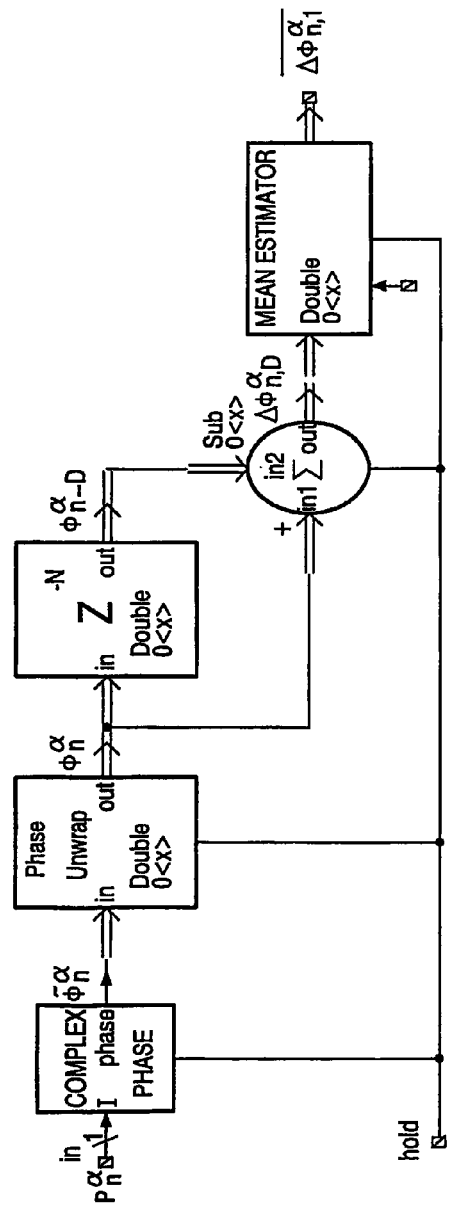
FIG. 9 shows a block diagram of a preferred embodiment of a non-linear Frequency Error Detector (FED).

If we look at FIG. 8, it can be seen that the angle of direction can be defined by taking the difference between two function values which are shifted in time and have equal values in the case that there is no carrier frequency offset ($\alpha = 0$). It can be seen from Eq. 15 and Eq. 23 that the periodicity of $\tilde{\phi}_n^\alpha$ and $\phi_n^\alpha$ equals 16, so every two function values which are 16 samples apart from each other have the same value, as can also be verified graphically in FIG. 7. The difference between $\phi_n^\alpha$ and $\phi_{n+16}^\alpha$ is constant for every n and proportional to the carrier frequency offset. If this constant value is contaminated by noise, the influence of this noise can be decreased by averaging the samples. All of the above mentioned operations with the signal names are shown in FIG. 9, the block diagram of the non-linear FED.

The signal $p_n^\alpha$ described by Eq. 19 and shown in FIG. 4 for $\alpha = 0$ is the input signal for the "complex phase" block. The output signal of the "complex phase" block is the wrapped phase $$\tilde{\phi}_n^\alpha = \frac{\pi}{4} + \alpha\frac{\pi}{32}n + \theta_n, \ mod(2\pi) \qquad (24)$$

of $p_n^\alpha$ and is shown as the solid line in FIG. 7 with no carrier frequency offset ($\alpha = 0$).

Applying the unwrap function $U_n$ to the input signal $\tilde{\phi}_n^\alpha$ yields $$\phi_n^\alpha \approx \frac{\pi}{4} + \alpha\frac{\pi}{32}n + \frac{7\pi}{4}\sin\left(\frac{\pi}{8}n\right), \qquad (25)$$

at the output of the "phase unwrap" block. This unwrapped phase signal is shown as the dotted lines in FIG. 7 for $\alpha = 0$ and in FIG. 8 for $\alpha = 1$.

Figure 10:
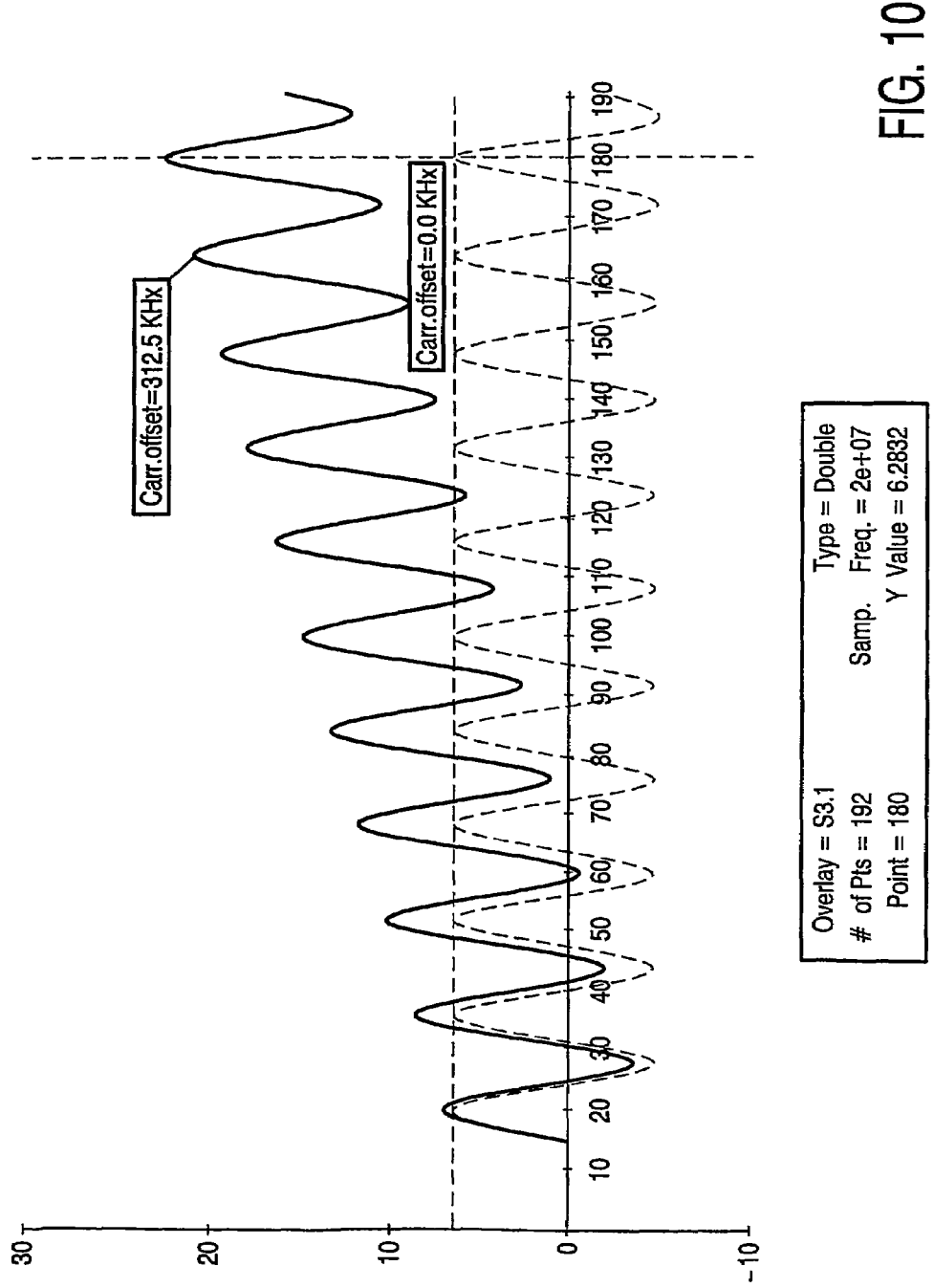
FIG. 10 shows a 16 sample-delayed IEEE preamble phase with no frequency offset ($\alpha=0$), and with $\Delta f=312.5$ kHz frequency offset (one inter-carrier spacing, $\alpha=1$).

The output signal of the "$Z^{-N}$" block is the delayed version of the unwrapped phase signal $$\phi_{n-D}^\alpha \approx \frac{\pi}{4} + \alpha\frac{\pi}{32}(n-D) + \frac{7\pi}{4}\sin\left\{\frac{\pi}{8}(n-D)\right\}, \qquad (26)$$

with D the number of delayed samples. With some goniometric equalities, Eq. 26 can be rewritten as $$\phi_{n-D}^\alpha \approx \frac{\pi}{4} + \alpha\frac{\pi}{32}(n-D) + \qquad (27)$$
$$\frac{7\pi}{4}\left[\sin\left(\frac{\pi}{8}n\right)\cos\left(\frac{\pi}{8}D\right) - \cos\left(\frac{\pi}{8}n\right)\sin\left(\frac{\pi}{8}D\right)\right],$$

substituting D=16 (the period of the IEEE preamble) in Eq. 27 yields $$\phi_{n-16}^\alpha \approx (1-2\alpha)\frac{\pi}{4} + \alpha\frac{\pi}{32}n + \frac{7\pi}{4}\sin\left(\frac{\pi}{8}n\right), \qquad (28)$$

and is shown in FIG. 10 for $\alpha = 0$ and $\alpha = 1$.

The output signal of the "subtract" block is the unwrapped phase difference signal $$\Delta\phi_{n-D}^\alpha \approx \frac{\pi}{4} + \alpha\frac{\pi}{32}n + \frac{7\pi}{4}\sin\left(\frac{\pi}{8}n\right) -$$
$$\left[\frac{\pi}{4} + \alpha\frac{\pi}{32}(n-D) + \frac{7\pi}{4}\sin\left\{\frac{\pi}{8}(n-D)\right\}\right]$$
$$= \alpha\frac{\pi}{32}D + \frac{7\pi}{4}\{[1-\cos(\frac{\pi}{8}D)]\sin(\frac{\pi}{8}n) + \sin(\frac{\pi}{8}D)\cos(\frac{\pi}{8}n)\},$$

and for D=16 Eq. 29 becomes $$\Delta\phi_{n-16}^\alpha \approx \alpha\frac{\pi}{2}, \qquad (30)$$

The sinewave behavior in the beginning of the curve is a switch-on phenomenon because the first 16 samples of $\phi_{n-16}^\alpha$ are equal to zero. These first 16 samples cannot be used for the detection of the carrier frequency offset, so in the case of the IEEE OFDM system, only 144 out of the 160 samples can be used.

Figure 11:
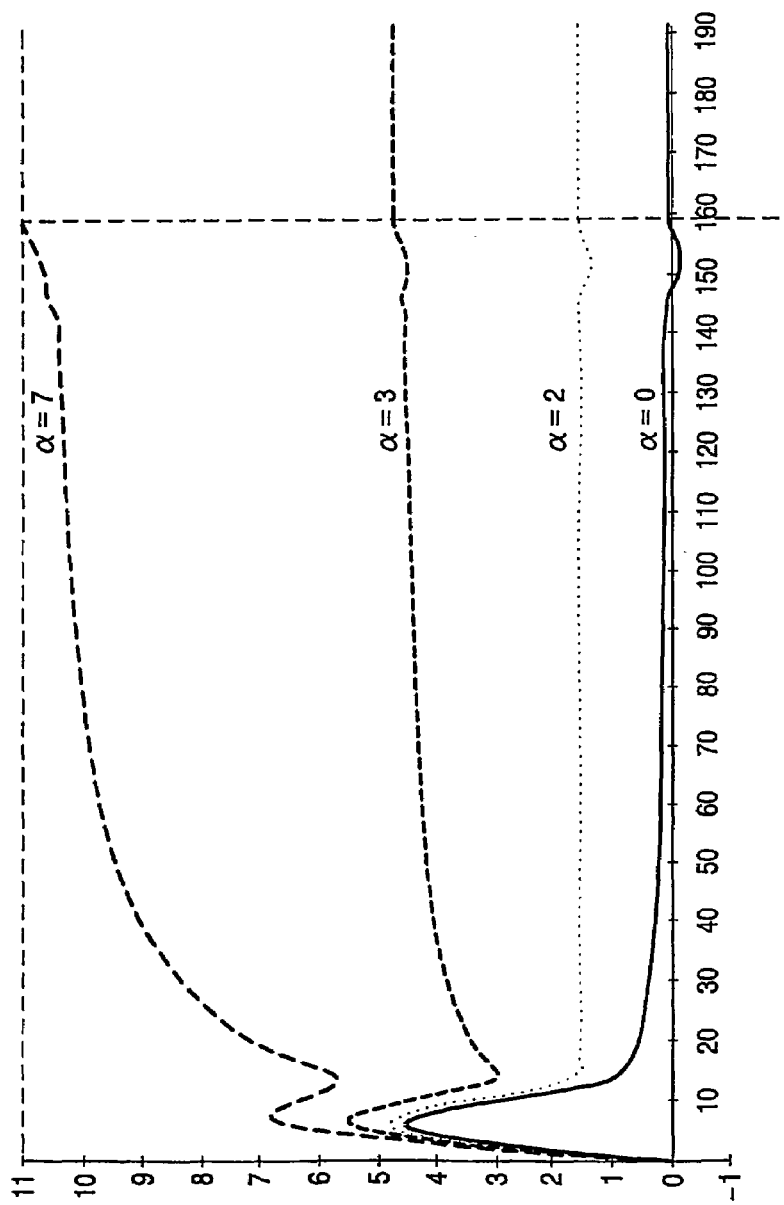
FIG. 11 shows an output of a non-linear Frequency Error Detector (FED) for different carrier frequency offsets $\Delta=0$, 1, 3, 7.

The output signal of the "mean estimator" block is the unwrapped phase difference signal average with a sliding window of 144 samples. The mean estimator takes the sum of the last 144 samples and divides this number by 144. The output of the mean estimator, also the FED output, is shown in FIG. 11 for different values of $\alpha = 0, 1, 3, 7$.

The value of the $160^{th}$ sample (sample number 159) is the exact representation of the carrier frequency offset, because the switch-on phenomenon has no influence on that sample anymore.

The unwrap function $U_n$ increases or decreases the $2\pi$ counter k depending on the phase difference between the last corrected sample and the current sample. If this phase difference is larger than the absolute value $|\pi|$ due to carrier frequency offset (large $\alpha$), noise or any other cause than the arctangent function, the FED will not be able to correct this. This limitation is the capture range of the non-linear FED and can be obtained by finding the n, whereby $\phi_n^{\alpha=0}$, shows a maximum phase change $$\max_n\left\{\frac{d\phi_n^\alpha}{dn}\bigg|_{\alpha=0}\right\} \approx \max_n\left\{\frac{7\pi^2}{32}\cos\left(\frac{\pi}{8}n\right)\right\} = \frac{7\pi^2}{32}, \quad (31)$$

$$\text{for } n = 0 \bmod(8)$$

substituting this in Eq. 29 with D=1 (consecutive samples) gives, $$\Delta\phi_{0,1}^{\alpha_{max}} \approx \alpha_{max}\left(\frac{\pi}{32}\right) + \frac{7\pi}{4}\sin\left(\frac{\pi}{8}\right) = \pi\left[\frac{\alpha_{max}}{32} + \frac{7}{4}\sin\left(\frac{\pi}{8}\right)\right]. \quad (32)$$

With the limitation of $\pm\pi$ between two consecutive samples, the capture range $\alpha_{max}$ will then be $$\pi\left[\frac{\alpha_{max}}{32} + \frac{7}{4}\sin\left(\frac{\pi}{8}\right)\right] = \quad (33)$$

$$\pm\pi \Rightarrow \alpha_{max} \approx \pm 32\left[1 - \frac{7}{4}\sin\left(\frac{\pi}{8}\right)\right] \approx \pm 10,$$

this number is not the exact capture range due to the approximation by the sinewave. It can be seen from Eq. 33 that the capture range is limited by the maximum phase jump in the sinewave part of $\phi_n^\alpha$. This phase jump between two consecutive samples can be decreased by i.a. oversampling. This oversampling increases the capture range. A factor of two oversampling yields $$\alpha_{max} \approx \pm 64\left[1 - \frac{7}{4}\sin\left(\frac{\pi}{16}\right)\right] \approx \pm 42, \quad (34)$$

this number is not the exact capture range due to the approximation by the sinewave.

The theoretical figures obtained, until now, for the non-linear FED with the IEEE preamble are:

Output value is $$\Delta\phi_{n,16}^\alpha \approx \alpha\frac{\pi}{2},$$

Capture range without oversampling is: $\alpha_{max} \approx \pm 10$ ($\Delta f_{max} \approx \pm 3.2$ MHz)

Capture range with oversampling by 2 is: $\alpha_{max} \approx \pm 42$ ($\Delta f_{max} \approx \pm 13.1$ MHz)

Figure 12:
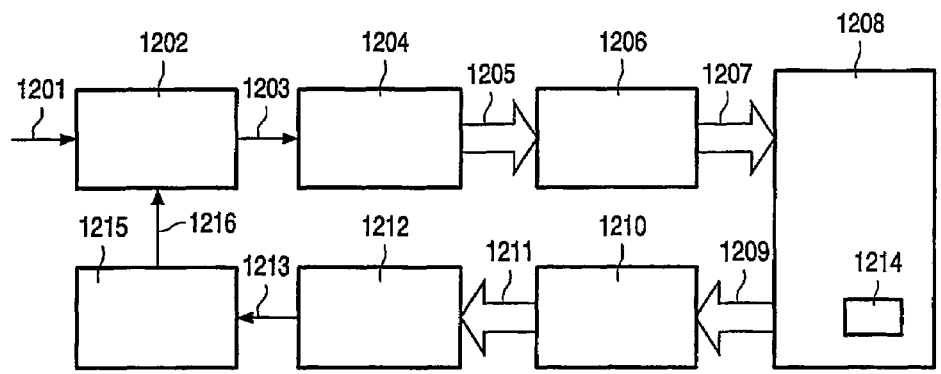
FIG. 12 shows a block diagram of the best mode of the invention.

FIG. 12 illustrates a block diagram of the best mode of the invention. An OFDM signal 1201 is connected to an input on a Frequency Offset to Voltage Converter 1202. An output signal 1203 on the Frequency Offset to Voltage Converter 1202 is connected to an input on an Analogue to Digital Converter 1204. An output data bus 1205 on the Analogue to Digital Converter 1204 is connected to an input data bus on an Input Buffer 1206. An output data bus 1207 on the Input Buffer 1206 is connected to an input data bus on a Microprocessor 1208. An output data bus 1209 on the Microprocessor 1208 is connected to an input data bus on an Output Buffer 1210. An output data bus 1211 on the Output Buffer 1210 is connected to a Digital to Analogue Converter 1212. An output signal 1213 on the Digital to Analogue Converter 1212 is connected to an Oscillator 1215. An output signal 1216 on the Oscillator 1215 is connected to an input on the Frequency Offset to Voltage Converter 1202. An Accumulator Register 1214 is included in the Microprocessor 1208.

The OFDM signal 1201 is received by an OFDM signal receiver (not shown) for normal signal reception and detection in accordance with common practice. The OFDM receiver is currently adjusted for frequency errors with respect to the incoming OFDM signal 1201. The frequency error detection and correction is performed in accordance with a novel method by this invention. According to this novel method, the OFDM signal 1201 is fed to a detector 1202 which produces an offset voltage on the output 1203, if the oscillator signal 1216 has a frequency offset with respect to the carrier frequency of the incoming signal 1201. The offset voltage 1203 is converted into a digital value 1205 which is currently supervised by a microprocessor 1208. In the evidence of the digital value 1205 exceeding predefined maximum or minimum values representing a phase offset of $\pm\pi$, the microprocessor will adjust the oscillator phase to its opposite minimum or maximum value, and keep track of the amount of phase corrected for in an internal accumulator register 1214. This means that if the phase exceeds $+\pi$, the phase will be corrected to $-\pi$, and if the phase exceeds $-\pi$ the phase will be corrected to $+\pi$. The correction is done by the microprocessor 1208 by writing a digital value to the output buffer 1210, which is converted 1212 to a voltage which in turn offsets the Oscillator 1215. The offset value represents a phase correction of $\pm\pi$. In this way the system is able to keep tracking, with frequency offsets going far beyond the $\pm\pi$ limitation of the detector 1202. The actual unwrapped phase is then a value which is currently stored in a computer, and the wrapped phase is the value at the detector 1202.

Figure 13:
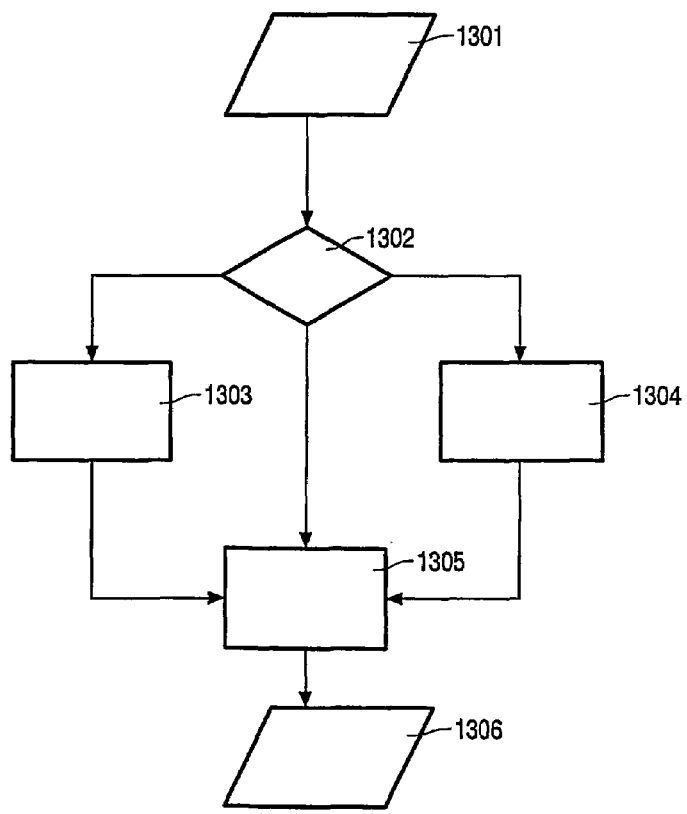
FIG. 13 shows a flow chart of an algorithm used in the best mode of the invention.

FIG. 13 illustrates a flow chart of an algorithm used in the best mode of the invention. The algorithm is implemented as a program in the Microprocessor 1208 indicated in FIG. 12. A Read Operation 1301 is followed by a Check 1302. The Check 1302 is followed by an Increment 1303. The Check 1302 is also followed by a Decrement 1304. The Increment 1303 is followed by a Calculation 1305. The Decrement 1304 is followed by the Calculation 1305. The Check 1302 is also followed by the Calculation 1305. The Calculation 1305 is followed by a Write Operation 1306.

The Input Buffer 1206 in FIG. 12 is read by the Read Operation 1301. If the value read represents a phase offset below $-\pi$, the Accumulator 1214 in FIG. 12 is incremented by $2\pi$ by the Increment 1303. If the value read represents a phase offset above $+\pi$, the Accumulator 1214 in FIG. 12 is decremented by $2\pi$ by the Decrement 1304. If the value read represents a phase offset between $-\pi$ and $+\pi$, the Accumulator 1214 in FIG. 12 is neither incremented nor decremented. Regardless of the operations performed on the Accumulator 1214, the value to be written to the Output Buffer 1210 in FIG. 12 is calculated 1305 as the read value from the Input Buffer 1206 plus the value in the Accumulator 1214. The Output Buffer 1210 is then set to the calculated value by a Write Operation 1306.

Figure 14:
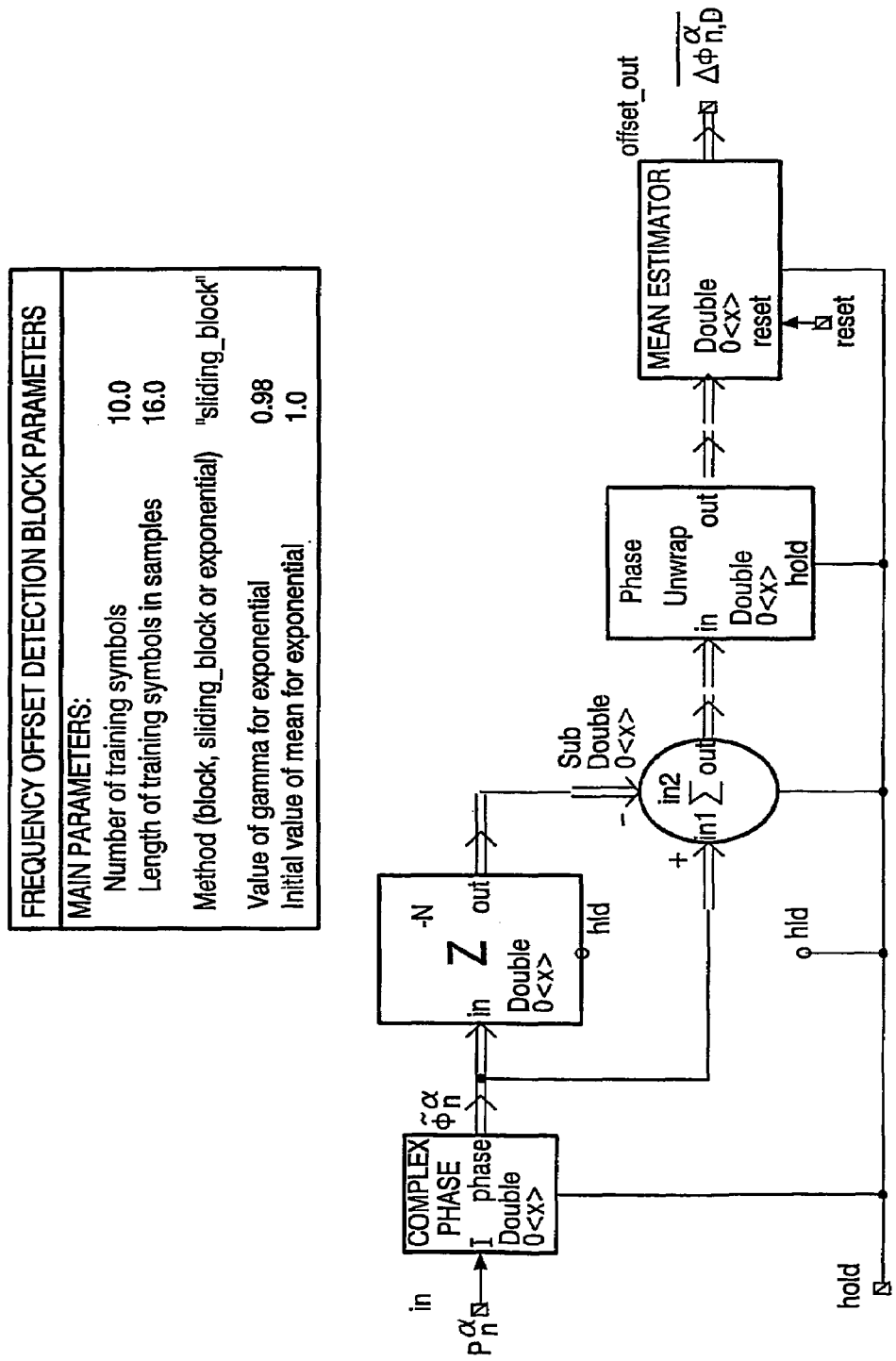
FIG. 14 shows a block diagram of another preferred embodiment of a non-linear Frequency Error Detector (FED).

FIG. 14 illustrates another preferred embodiment of the invention. The position of the "phase-unwrap" block in the model used is changed with respect to the block diagram of the non-linear FED shown in FIG. 9. The "phase-unwrap" block is moved from just after the "complex phase" block, see FIG. 9, to just after the "subtract" block, so the unwrap function $U_n$ is applied to the phase difference signal instead of the wrapped phase signal $\tilde{\phi}_n^\alpha$.

The invention claimed is:

1. A method of detecting frequency errors in a receiver, comprising:
    calculating the phase of an incoming complex signal with an arctangent function,
    producing an unwrap function from the output signal from the arctangent function,
    removing a modulo $2\pi$ limitation introduced with the arctangent function by means of the unwrap function, thereby producing an absolute phase representation,
    at successive sample times, producing from the absolute phase representation phase representation values, and
    determining the frequency error by differencing phase representation values which are shifted in time by a predetermined number of sample times greater than one.

2. A method according to claim 1, wherein the unwrap function accumulates k times $2\pi$, where k depends on the wrapped function so that k will be increased by 1 if the difference between the last corrected sample and the current sample is smaller than $\pi-$ and k will be decreased by 1 if the difference between the last corrected sample and the current sample is greater than $\pi$.

3. A method according to claim 1, wherein the phase of the incoming complex signal is calculated on a sample-by-sample basis of the in-phase and quadrature components of the signal.

4. A method according to claim 1, wherein the incoming signal comprises specific, discrete preamble signals and data signals.

5. A method according to claim 4, wherein the incoming signal is modulated according to OFDM.

6. A method according to claim 4, wherein the incoming signal is modulated according to CPFSK.

7. An apparatus for performing the method of claim 1, comprising a complex phase calculator for calculating the phase of an incoming complex signal on a sample-by-sample basis of the in-phase and quadrature components of the signal and performing an arctangent function on the in-phase and quadrature components of the incoming signal, a phase unwrap module for removing discontinuities in the phase if the phase passes the in-phase axes in the complex plane with an absolute value greater than $\pi$, and a comparator module arranged to compare the difference in phase signal values at predetermined time intervals, the difference in said values representing frequency errors in the input signal to the complex phase calculator.

8. An apparatus according to claim 7, wherein the phase unwrap module is inserted between the complex phase calculator and the comparator module.

9. An apparatus according to claim 7, wherein the comparator module is inserted between the complex phase calculator and the phase unwrap module.

10. An apparatus according to claim 7, comprising a mean estimator circuit arranged to receive the output signal representing the frequency error.

* * * * *